(12) United States Patent
Orth et al.

(10) Patent No.: US 11,719,605 B2
(45) Date of Patent: Aug. 8, 2023

(54) VIBRATION MILL AND METHOD FOR MILLING A MILLING MATERIAL

(71) Applicant: Retsch GmbH, Haan (DE)

(72) Inventors: Uwe Orth, Monschau (DE); Stefan Drechsler, Hattingen (DE); Frank Janetta, Bottrop (DE); Alexander Mühlig, Cologne (DE)

(73) Assignee: Retsch GmbH, Haan (DE)

( * ) Notice: Subject to any disclaimer, the term of this patent is extended or adjusted under 35 U.S.C. 154(b) by 540 days.

(21) Appl. No.: 16/754,336

(22) PCT Filed: May 7, 2019

(86) PCT No.: PCT/EP2019/061622
§ 371 (c)(1),
(2) Date: Apr. 7, 2020

(87) PCT Pub. No.: WO2019/228764
PCT Pub. Date: Dec. 5, 2019

(65) Prior Publication Data
US 2020/0333219 A1    Oct. 22, 2020

(30) Foreign Application Priority Data

Jun. 1, 2018 (DE) .......................... 102018113139.9
Mar. 19, 2019 (DE) .......................... 102019106915.7

(51) Int. Cl.
*G01N 1/00* (2006.01)
*G01N 1/28* (2006.01)
(Continued)

(52) U.S. Cl.
CPC ................ *G01N 1/286* (2013.01); *B01L 9/00* (2013.01); *B02C 19/005* (2013.01); *B02C 19/16* (2013.01);
(Continued)

(58) Field of Classification Search
None
See application file for complete search history.

(56) References Cited

U.S. PATENT DOCUMENTS 7,448,789 B2 * 11/2008 Boquet .................. F16C 19/55
366/209

FOREIGN PATENT DOCUMENTS

CN         202447149       *  2/2012
CN         202447149  U      9/2012

OTHER PUBLICATIONS

International Search Report and Written Opinion issued in corresponding PCT Application No. PCT/EP2019/061622, dated Sep. 6, 2019.

* cited by examiner

*Primary Examiner* — Jyoti Nagpaul
(74) *Attorney, Agent, or Firm* — Andrus Intellectual Property Law, LLP

(57) ABSTRACT

The invention shows and describes a vibration mill for at least two grinding beakers performing vibrations in the horizontal position, with at least one multi-part pendulum drive, wherein the pendulum drive has at least one eccentric shaft mounted to rotate about a vertical eccentric axis, and at least two rockers each mounted so as to be capable of vibrating about a vertical vibration axis and connected by means of couplers to the eccentric shaft, said rockers holding the grinding beakers. The pendulum drive further has a motor unit coupled to the eccentric shaft as a drive for the eccentric shaft and optionally further components, wherein a rotary movement of the eccentric shaft via the couplers can be converted into a vibrating movement of the rockers. According to the invention, the centre of gravity of the pendulum drive in a horizontal centre of gravity plane is substantially equidistant from both vibration axes.

10 Claims, 7 Drawing Sheets

(51) Int. Cl.
*B01L 9/00* (2006.01)
*B02C 19/00* (2006.01)
*B02C 19/16* (2006.01)

(52) U.S. Cl.
CPC ... *B01L 2300/06* (2013.01); *B01L 2300/0609* (2013.01); *B01L 2300/0809* (2013.01); *G01N 2001/2866* (2013.01)

VIBRATION MILL AND METHOD FOR MILLING A MILLING MATERIAL

CROSS-REFERENCE TO RELATED APPLICATIONS

This application is the U.S. national stage application of International Application PCT/EP2019/061622, filed May 7, 2019, which International Application was published on Dec. 5, 2019, as International Publication WO 2019/228764 in the German language. The International Application claims priority to German Application No. 102018113139.9, filed Jun. 1, 2018, and German Application No. 102019106915.7, filed Mar. 19, 2019. The International Application and German Applications are all incorporated herein by reference, in their entireties.

FIELD

The invention relates to a vibration mill for at least two milling beakers which perform preferably radial oscillations in a horizontal position, having a multi-part pendulum drive for moving the milling beakers in an oscillating manner, wherein the pendulum drive comprises at least one eccentric shaft which is rotatably mounted about a vertical eccentric axis, at least two rockers for holding the milling beakers, which rockers are each mounted about a vertical pendulum or oscillation axis so as to be capable of oscillation and are connected via couplers to the eccentric shaft, a motor unit coupled with the eccentric shaft as a drive for the eccentric shaft, and optionally further components, and wherein a rotary movement of the eccentric shaft can be converted via the couplers into an oscillating movement of the rockers.

In addition, the present invention relates to a method for milling a milling material by means of a vibration mill in at least two milling beakers which perform oscillations in a horizontal position, wherein the vibration mill comprises a multi-part pendulum drive having an eccentric shaft which is rotatably mounted about a vertical eccentric axis, two rockers for holding the milling beakers, which rockers are each mounted about a vertical oscillation axis so as to be capable of oscillation and are connected via couplers to the eccentric shaft, a motor unit coupled with the eccentric shaft as a drive for the eccentric shaft, and optionally further components, and wherein a rotary movement of the eccentric shaft is converted via the couplers into oscillating movements of the rockers.

BACKGROUND

The vibration mill "MM 400" of the applicant is known from the prior art. The known vibration mill is a compact bench-top device which has been developed specifically for the dry, wet and cryogenic milling of small amounts of sample. The "MM 400" is designed to mix and homogenize powders and suspensions. In addition, the vibration mill is suitable for the disruption of biological cells for DNA/RNA and protein extraction. Application examples of the known vibration mill are the treatment of waste samples, soils, chemical products, drugs, electronic scrap, ores, cereals, tissue, glass, hair, wood, ceramics, sewage sludge, bones, coal, coke, plastics, alloys, minerals, oil seeds, paper, plant parts, straw, tobacco, tablets, textiles, animal feed and wool. It will be appreciated that the above-mentioned list is not exhaustive.

The known vibration mill "MM 400" is distinguished by reproducible, efficient grinding, mixing and homogenization. The pendulum drive of the vibration mill results in powerful milling by impact and friction at a frequency of up to 30 Hz and for up to 20 samples per run. In addition, efficient cell disruption for DNA/RNA and also protein extraction is possible. A further application example concerns the isolation of bacteria from tissue for the accurate diagnosis of infections.

The milling beakers of the known vibration mill perform radial oscillations in a horizontal plane. Because of the inertia of the balls, the balls impact with high energy on the sample material at the rounded end faces of the milling beakers, so that the sample material is ground. Because of the movement of the beakers and the pattern of movement of the balls, intensive mixing takes place at the same time. The degree of mixing can be increased further by using smaller balls. If a large number of small balls, for example glass beads, is used, biological cells can also be disrupted. The large frictional impact effect between the balls ensures effective cell disruption.

With short milling times of less than 2 minutes, in particular of less than 1 minute, for example in the region of 30 seconds or less, uneven grinding, mixing and homogenization of a sample material in the milling beakers held by different rockers of the pendulum drive can occur in the known vibration mill. As the treatment time of the samples increases, grinding, mixing and homogenization differences no longer appear, or are evened out. However, if sample processing has to be carried out with short milling times, for example in order to avoid excessive heating of the sample material and/or undesirable reactions of the sample material during processing of the sample, the uneven grinding, mixing and homogenization result in the milling beakers is disadvantageous. Furthermore, it has been shown that the above-described effects increasingly occur as the mass of the milling beakers, or the mass of the samples, increases.

SUMMARY

The object of the present invention is to provide a vibration mill of the type mentioned at the beginning which is distinguished, in particular with short sample treatment or processing times, by a very uniform grinding, mixing and homogenization result in the milling beakers held by different rockers of the pendulum drive, in particular also with milling beaker sizes of more than 50 ml. As a result of larger milling beaker volumes, the vibration mill is further intended in particular to be capable of use as a competing device to planetary ball mills.

The above-mentioned object is achieved by a vibration mill having the features of claim 1 and by a method having the features of claim 10. Advantageous embodiments of the invention are subject-matter of the dependent claims.

In the vibration mill according to the invention, the center of gravity, or center of mass, of the pendulum drive in a horizontal plane passing through the center of gravity, called the "center of gravity plane" hereinbelow, is at least substantially equidistant from both oscillation axes. The idea underlying the invention is to prescribe a specific position of the center of gravity of the pendulum drive by the arrangement of the mass relevant components of the pendulum drive relative to one another, in which position the distance between the center of gravity and the pendulum axes is substantially equal. The position of the center of gravity of the pendulum drive prescribed according to the invention at substantially the same distance from the oscillation axes results during operation of the vibration mill in substantially equal oscillating movements, in particular equal frequencies and equal accelerations, of the milling beakers held on different rockers. In comparison with the known vibration mill, very similar to largely identical grinding, mixing and homogenization results can thus be achieved in the milling beakers held on different rockers with short milling times of in particular less than 60 seconds, further in particular of less than 30 seconds, for example with milling times of 10 seconds.

With short milling times of preferably less than 60 seconds, further preferably less than 30 seconds, particularly preferably less than 10 seconds, it is possible in particular to achieve a substantially equally broad grain size distribution in the milling beakers held on different rockers. Ideally, the particle size distribution after such short milling times has equal $d_{90}$ values in both milling beakers, wherein "equal $d_{90}$ values" within the meaning of the invention can permit a deviation in the breadths of two particle size distributions of less than 10%, preferably of less than 5%, further preferably of less than 2%. The particle size distributions can be determined in a manner known per se from the prior art by sieving in accordance with DIN 66165.

The position of the center of gravity of the pendulum drive of the vibration mill according to the invention permits milling by impact and friction also with higher frequencies than 30 Hz, for example with 35 Hz or also with even higher frequencies.

The center of gravity of the pendulum drive can also be "substantially equidistant" from the oscillation axes within the meaning of the invention if the distance of the center of gravity of the pendulum drive from one oscillation axis is (slightly) greater than the distance from the other oscillation axis. Thus, the distance of the center of gravity from an oscillation axis located slightly further away can be less than 30%, preferably less than 25%, further preferably less than 20%, particularly preferably less than 15%, but in particular less than 10%, greater than the distance from the closer oscillation axis, based on the distance of the center of gravity from the closer oscillation axis.

In a particularly preferred embodiment of the invention, the center of gravity of the pendulum drive in the center of gravity plane is at an identical distance from both oscillation axes.

The structural unit "pendulum drive" within the meaning of the invention comprises, in addition to the motor unit, at least or also only the eccentric shaft and the shaft bearing thereof, the couplers and the rockers and the bearing parts thereof. In addition, the structural unit "pendulum drive" can preferably comprise mass relevant further components, such as, for example, a balancing weight, the arrangement of which relative to one another has a perceptible influence on the position of the center of gravity.

The position of the center of gravity of the pendulum drive is influenced in principle by the mass and geometry of all the mass relevant components of the pendulum drive and the arrangement thereof relative to one another. The center of gravity of the pendulum drive can be determined substantially exactly by way of calculation taking into account all the components of the pendulum drive. However, in an approximation, the position of the center of gravity of the pendulum drive can also be determined merely taking into account an arrangement formed of the motor unit, the eccentric shaft and the shaft bearing thereof, the couplers, the rockers and the bearing parts via which the rockers are rotatably mounted, or mounted so as to be capable of oscillation. The arrangement of the motor unit relative to the further mass relevant components of the pendulum drive, in particular relative to the eccentric shaft and the shaft bearing and also relative to the rockers, and the bearing parts thereof, connected via the couplers to the eccentric shaft, can be of substantial importance for the position of the center of gravity, due to the high weight.

Particularly preferably, the structural unit "pendulum drive" within the meaning of the invention comprises a single- or multi-part common base plate on which the motor unit, the eccentric shaft and the shaft bearing thereof, and also the rockers, and the bearing parts thereof, connected via the couplers to the eccentric shaft, are supported and/or mounted and/or held. In addition, further components of the pendulum drive can be supported and/or mounted and/or held on the base plate. The center of gravity of the pendulum drive can then be determined approximately merely by taking into account the motor unit, the eccentric shaft and the shaft bearing thereof, the couplers, the rockers and the bearing parts thereof, and also the base plate.

The motor unit, the shaft bearing and the rockers, and optionally further components, can be arranged and/or mounted on a common base plate and, together with the base plate, form a system capable of oscillation. On operation of the vibration mill, in particular the motor unit and the eccentric shaft, and optionally further components, such as the rockers, perform oscillating movements which are transmitted to the base plate. Belt vibrations of a toothed belt provided for torque transfer from a motor shaft to the eccentric shaft can also be transmitted to the base plate. Preferably, the position of the center of gravity is so fixed, by the arrangement of the components of the pendulum drive relative to one another, in particular by the arrangement of the motor unit relative to the eccentric shaft and to the rockers, that oscillations of the base plate are compensated as far as possible. In particular, by means of a specific position of the center of gravity of the pendulum drive, oscillations that are transmitted to the base plate in the region of the motor unit and in the region of the eccentric shaft are to be compensated as far as possible.

In order to protect the vibration mill from oscillatory immissions, or dynamic stress, from the environment and/or in order to protect the environment from oscillatory immissions, or dynamic stress, from the vibration mill, the base plate can be positioned or mounted on a bottom part of the vibration mill or any other substrate via elements having resilient and damping properties (spring/damping elements).

The milling beakers provided for the use of the vibration mill according to the invention can have, for example, a capacity of 1.5 ml, 5 ml, 10 ml, 25 ml or 35 ml. However, owing to the equal distance provided according to the invention of the center of gravity of the pendulum drive from the oscillation axes of the milling beakers, and the resulting equal movements of the milling beakers, milling beakers having a capacity of more than 30 ml, for example of 50 ml, or even of 80 ml or more, can also be used in the vibration mill according to the invention. Capacities of 125 ml, 200 ml or even 500 ml are in principle not ruled out. In particular fields of application in which planetary ball mills have hitherto usually been used are thus opened up to the vibration mill according to the invention.

In particular when milling beaker holders, for example adapter plates, with which the milling beakers are fastened to the oscillation axes of the pendulum drive and/or milling beakers are changed and replaced by milling beaker holders and/or milling beakers having a different mass and/or different geometry, the position of the center of gravity of the pendulum drive also changes. In order then to ensure that the center of gravity of the pendulum drive is nevertheless at least substantially equidistant from both oscillation axes, the method according to the invention provides that the position of the center of gravity of the pendulum drive is so changed, by preferably automatically adjusting the position of the motor unit and/or the position of at least one balancing weight of the pendulum drive, that the center of gravity of the pendulum drive is again at least substantially equidistant from both oscillation axes. With a mirror-symmetrical arrangement of the eccentric axes, it can be provided, for example, that the motor unit is displaced on the base plate automatically or manually by means of corresponding guides along and/or transversely to the axis of symmetry and/or is fixed to the base plate at specific predetermined positions along or transversely to the axis of symmetry.

If a milling beaker holder is exchanged for a milling beaker holder having a different geometry and, as a result of the exchange, the distance between the oscillation axis and a milling beaker held on the milling beaker holder changes, then the oscillation displacement of the milling beaker during operation of the vibration mill and the position of the center of gravity of the pendulum drive thus also change correspondingly. The same can also occur in the case of a change of milling beaker. In this context, a measuring device can be provided for automatically detecting, or measuring, the oscillation displacement and/or (different) oscillations of the milling beakers. Depending on the measured values, automatic correction of the position of the center of gravity by means of a measuring, control and/or regulating device can then be provided. For this purpose, the position of the motor unit and/or of a balancing weight of the pendulum drive can be changed automatically, for example, in order to achieve a specific position of the center of gravity of the pendulum drive at which, in particular, the oscillations transmitted from the motor unit and the eccentric shaft to the base plate are (again) largely compensated.

The motor unit (relative to the vertical center of gravity axis thereof), the eccentric shaft (relative to the eccentric axis thereof) and the rockers (relative to the oscillation axes thereof) can be arranged symmetrically to one another. Preferably, the center of gravity of the pendulum drive lies in the center of gravity plane on the axis of symmetry. The pendulum drive can then have a strictly symmetrical construction, in order to achieve a very uniform grinding, mixing and homogenization result in the milling beakers held on different rockers of the pendulum drive.

It is advantageous if the center of gravity of the pendulum drive and the oscillation axes form a preferably isosceles triangle in the center of gravity plane (relative to the points of intersection of the axes with the plane). The vertical eccentric axis can thereby intersect the median of the side line, passing through the oscillation axes, of the triangle formed in the center of gravity plane. Preferably, the eccentric axis can intersect the median in the middle. The point of intersection thus lies within the triangle area of the triangle that is formed.

Moreover, the oscillation axes can be arranged in the center of gravity plane (relative to the points of intersection of the axes with the plane) mirror-symmetrically with respect to the eccentric axis and likewise form an isosceles triangle with the eccentric axis.

Further preferably, in order to achieve the above-mentioned object there is provided an arrangement of the components in which the oscillation axes and a vertical axis through the center of gravity of the motor unit form an isosceles triangle in the center of gravity plane (relative to the points of intersection of the axes with the plane). The center of gravity of the pendulum drive can particularly preferably lie on the median of the side line, passing through the oscillation axes, of the triangle that is formed. The median connects, in the center of gravity plane, the vertical axis through the center of gravity of the motor unit and the side line, passing through the oscillation axes, of the triangle that is formed. In particular, the center of gravity of the pendulum drive lies between the vertical center of gravity axis of the motor unit and the eccentric axis. The distance of the center of gravity of the pendulum drive from the midpoint of the median of the triangle that is formed is, for example, less than 20%, preferably less than 15%, further preferably less than 10%, of half the length of the median. The center of gravity of the pendulum drive can then be offset relative to the midpoint of the median in the direction towards the eccentric axis. In other words, there is provided a component arrangement of the pendulum drive in which the center of gravity of the pendulum drive is adjacent to the eccentric axis.

Also possible is an embodiment in which the oscillation axes and a vertical center of gravity axis of the motor unit form a preferably isosceles triangle in the center of gravity plane (relative to the points of intersection of the axes with the plane), but the center of gravity of the pendulum drive does not lie exactly on the median of the side line, passing through the oscillation axes, of the triangle that is formed. The lateral distance between the center of gravity of the pendulum drive and the median can thereby be less than 20%, preferably less than 15%, further preferably less than 10%, of half the length of the side line passing through the oscillation axes.

For the shaft bearing of the eccentric shaft and for the bearing of the rockers there can be provided a frame-, grid- or rack-like bearing structure, wherein, preferably, the eccentric shaft is mounted vertically in the region beneath the couplers via the base plate and vertically in the region above the couplers via a cross-member which is fixedly connected to the base plate. Laterally, in particular on the side of the eccentric shaft facing the motor unit, a supporting wall can be provided which connects the cross-member to the base plate. A supporting wall can additionally be provided on the side of the rockers, likewise for connecting the cross-member to the support plate. Oscillations of the base plate of the pendulum drive attributable to the bearing of the eccentric shaft and/or of the rockers can thus be largely reduced, which contributes towards evening out the grinding results in the milling beakers held on different rockers.

For changing and adjusting the position of the center of gravity of the pendulum drive there can additionally be provided at least one, preferably displaceable and/or adjustable balancing weight. This in principle makes it possible to deviate from a strictly symmetrical construction of the pendulum drive. In particular, by using at least one balancing weight, it is possible not to have to arrange the motor unit symmetrically with respect to the eccentric shaft and the rockers and nevertheless to achieve a position of the center of gravity in which oscillations of the base plate are largely compensated.

A change in the position of the center of gravity of the pendulum drive can in particular be the result of the use of milling beaker holders of different forms.

BRIEF DESCRIPTION OF THE DRAWINGS

The invention will be explained in greater detail hereinbelow by means of an exemplary embodiment. All the features described and/or depicted in the drawings thereby form the subject-matter of the present invention on their own or in any combination, independently of their combination in the claims or the dependency thereof.

In the drawing.

DETAILED DESCRIPTION

Figure 1:
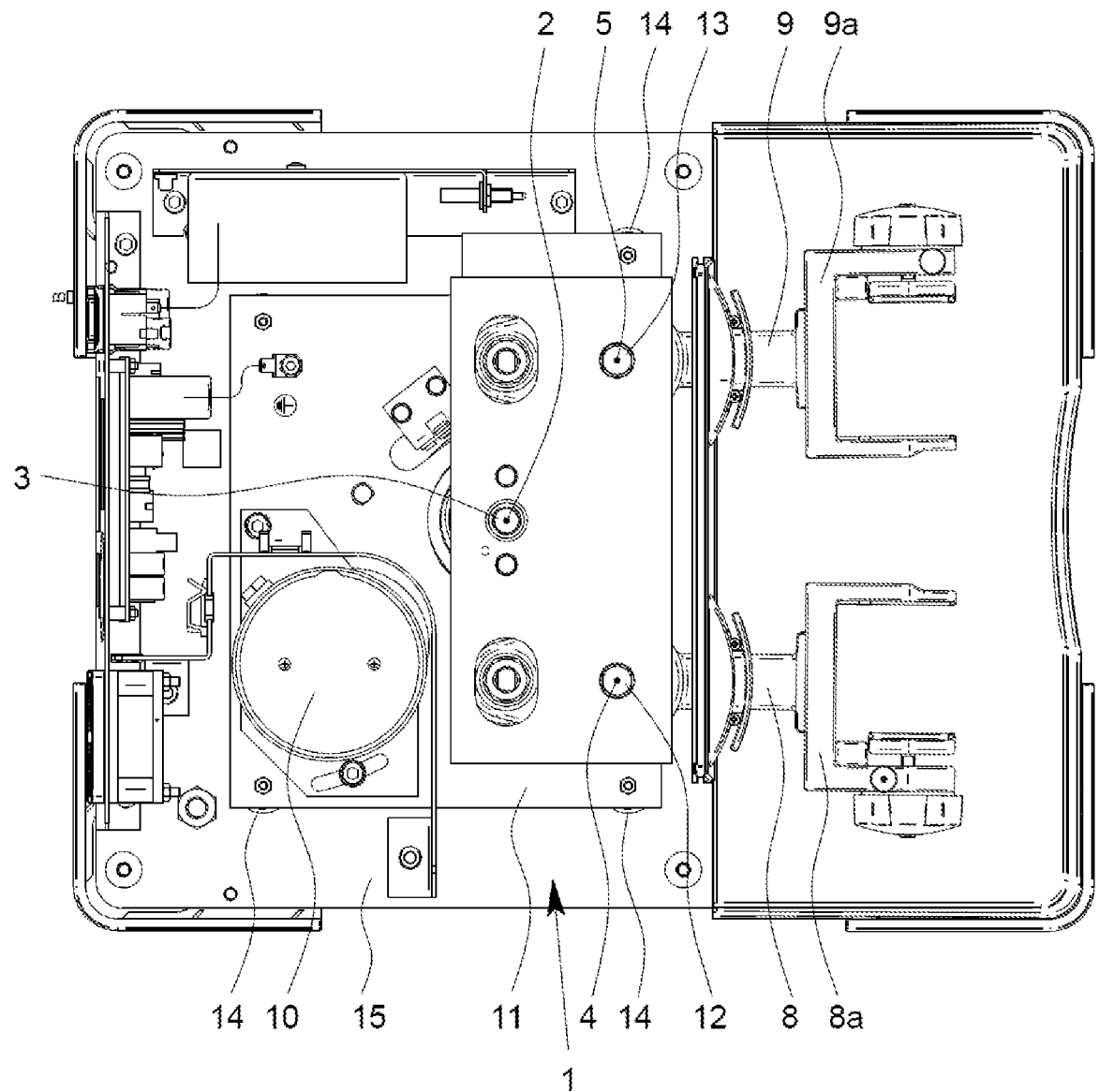
FIG. 1 is a partial view from above of a vibration mill known from the prior art with a multi-part pendulum drive.

FIG. 1 is a plan view of the pendulum drive 1 of a vibration mill known from the prior art for two milling beakers, not shown, which perform radial oscillations in a horizontal position. The pendulum drive 1 is in multi-part form with an eccentric shaft 3 rotatably mounted about a vertical eccentric axis 2 and with two rockers 8, 9 which are each mounted about a vertical oscillation axis 4, 5 so as to be capable of oscillation and are connected via couplers to the eccentric shaft 3. Milling beaker holders 8a, 9a for milling beakers, not shown, are fastened to the rockers 8, 9. There is additionally provided a motor unit 10 for torque transfer which is coupled with the eccentric shaft 3 via a V-belt, not shown. The eccentric shaft 3 is rotatably mounted on a base plate 11. Two bearing pins 12, 13 are additionally fastened to the base plate 11, about which bearing pins the rockers 8, 9 are rotatably mounted. Finally, the motor unit 10 is arranged on the base plate 11. The eccentric shaft 3, the bearing pins 12, 13 and the motor unit 10 thus form, together with the base plate 11, a structural unit which stands via damping elements 14 on a bottom part 15 of the vibration mill.

The rockers 8, 9 are arranged mirror-symmetrically with respect to the eccentric shaft 3, the eccentric axis 2 lies on the axis of symmetry. With reference to FIG. 1, the motor unit 10 lies beneath the axis of symmetry. Because of the high weight of the motor unit 10, the center of gravity of the pendulum drive 1 lies adjacent to the motor unit 10.

The motor unit 10 transfers a torque via the V-belt to the eccentric shaft 3. A rotary movement of the eccentric shaft 3 is converted via the couplers into an oscillating movement of the rockers 8, 9.

On operation of the known vibration mill, it is found with short milling times in particular of less than 60 seconds, further in particular of less than 30 seconds, that the grinding, mixing and homogenization results in the milling beakers held on different rockers 8, 9 can differ from one another. With longer milling times, on the other hand, the results of the sample treatment in the milling beakers are evened out, whereby, for example, after milling times of more than 2 minutes, the particle size distribution in the milling beakers held on different rockers 8, 9 can have a substantially equal breadth.

FIGS. 2 to 7 show a further developed embodiment of a vibration mill for at least two milling beakers which perform oscillations in a horizontal position, wherein the milling beaker holders and the milling beakers are not shown. The vibration mill has a multi-part pendulum drive 1, the basic structure of which is similar to the basic structure of the pendulum drive 1 shown in FIG. 1. Structurally and functionally identical components of the pendulum drives 1 shown in FIGS. 1 to 7 are identified by the same reference numerals.

The pendulum drive 1 of the vibration mill shown in FIGS. 2 to 7 likewise has a vertical eccentric axis 2, about which an eccentric shaft 3 is rotatably mounted. There are additionally provided two rockers 8, 9 for holding milling beakers, wherein the rockers 8, 9 can be connected to milling beaker holders, not shown. The rockers 8, 9 are held via ball bearings 17 (FIG. 5) on bearing pins 12, 13 so as to be rotatable about vertical oscillation axes 4, 5. In addition, the rockers 8, 9 are connected via couplers 6, 7 (FIG. 7) to the eccentric shaft 3. For that purpose, the couplers 6, 7 are rotatably or pivotably held on pins 19, 20 (FIG. 7) of the rockers 8, 9 and on eccentrics 19a, 20a of the eccentric shaft 3. A rotary movement of the eccentric shaft 3 can thus be converted via the couplers 6, 7 into opposing oscillating movements of the rockers 8, 9. For driving the eccentric shaft 3 there is provided a motor unit 10, wherein a motor shaft 10a transfers a torque to the eccentric shaft 3 via a V-belt 18 (FIG. 4) on the underside of the pendulum drive 1.

The eccentric shaft 3, the bearing pins 12, 13 with the rockers 8, 9 and the motor unit 10, as well as further components of the pendulum drive 1, are mounted or supported on a base plate 11. The base plate 11 stands via damping elements 14, for example rubber/spring elements, on a bottom part, not shown, of the vibration mill or on a substrate. The pendulum drive 1 thus comprises in particular the eccentric shaft 3 and the bearing parts thereof, the rockers 8, 9 and the bearing parts thereof, the couplers 6, 7 and the motor unit 10, as well as the base plate 11 and optionally further components.

Figure 2:
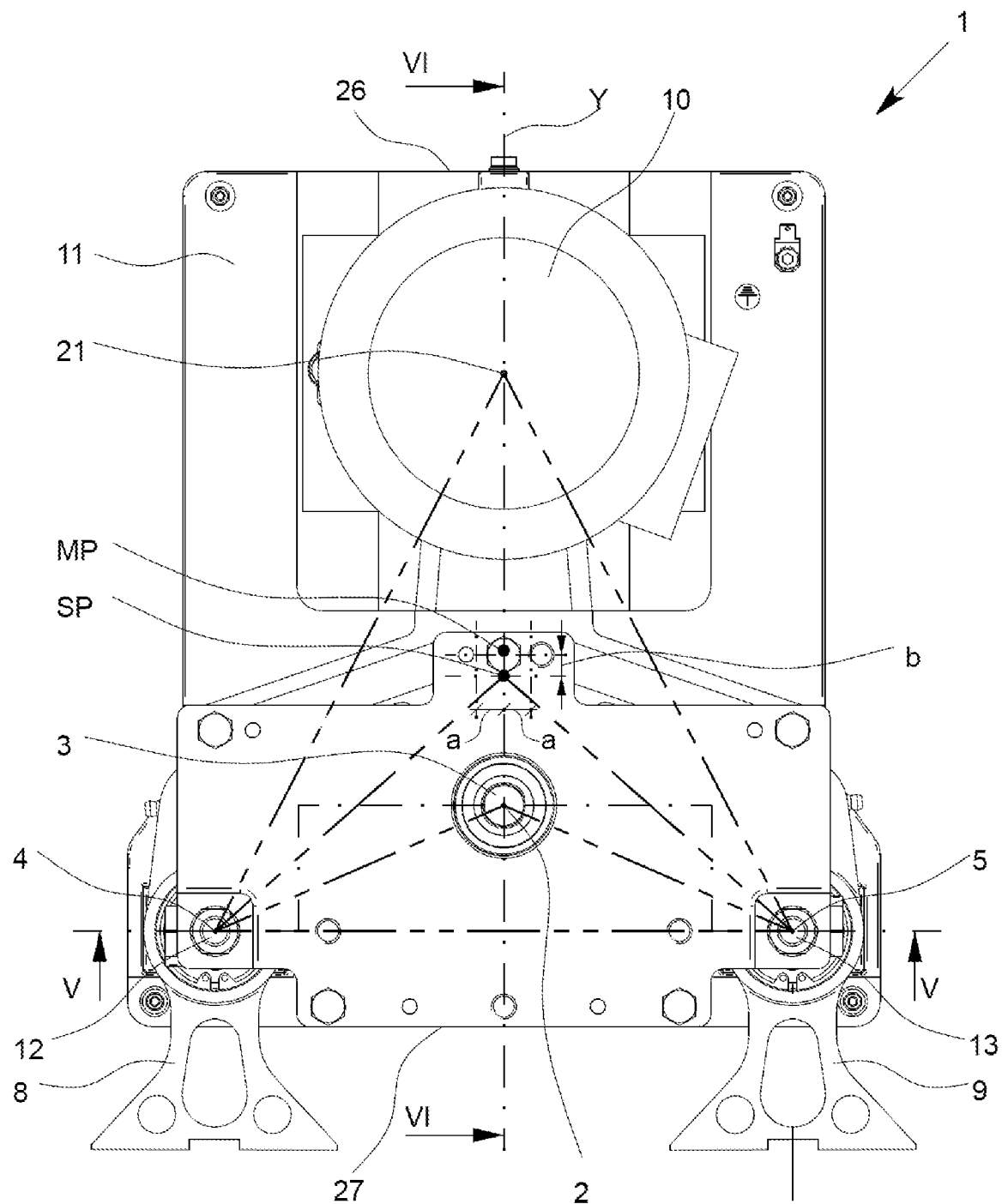
FIG. 2 is a plan view of the pendulum drive of a vibration mill according to the invention.
Figure 3:
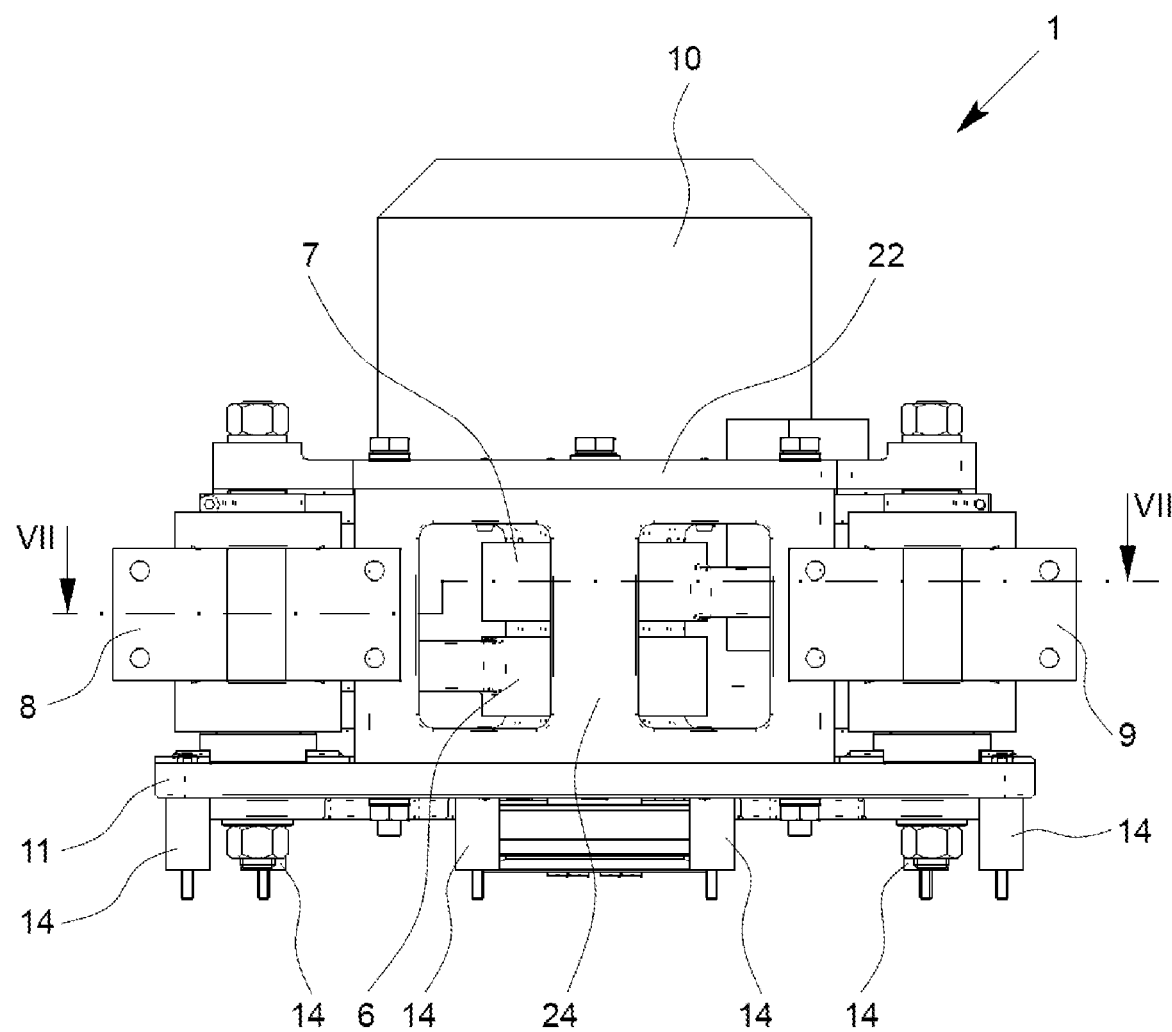
FIG. 3 is a front view of the pendulum drive of FIG. 2.
Figure 4:
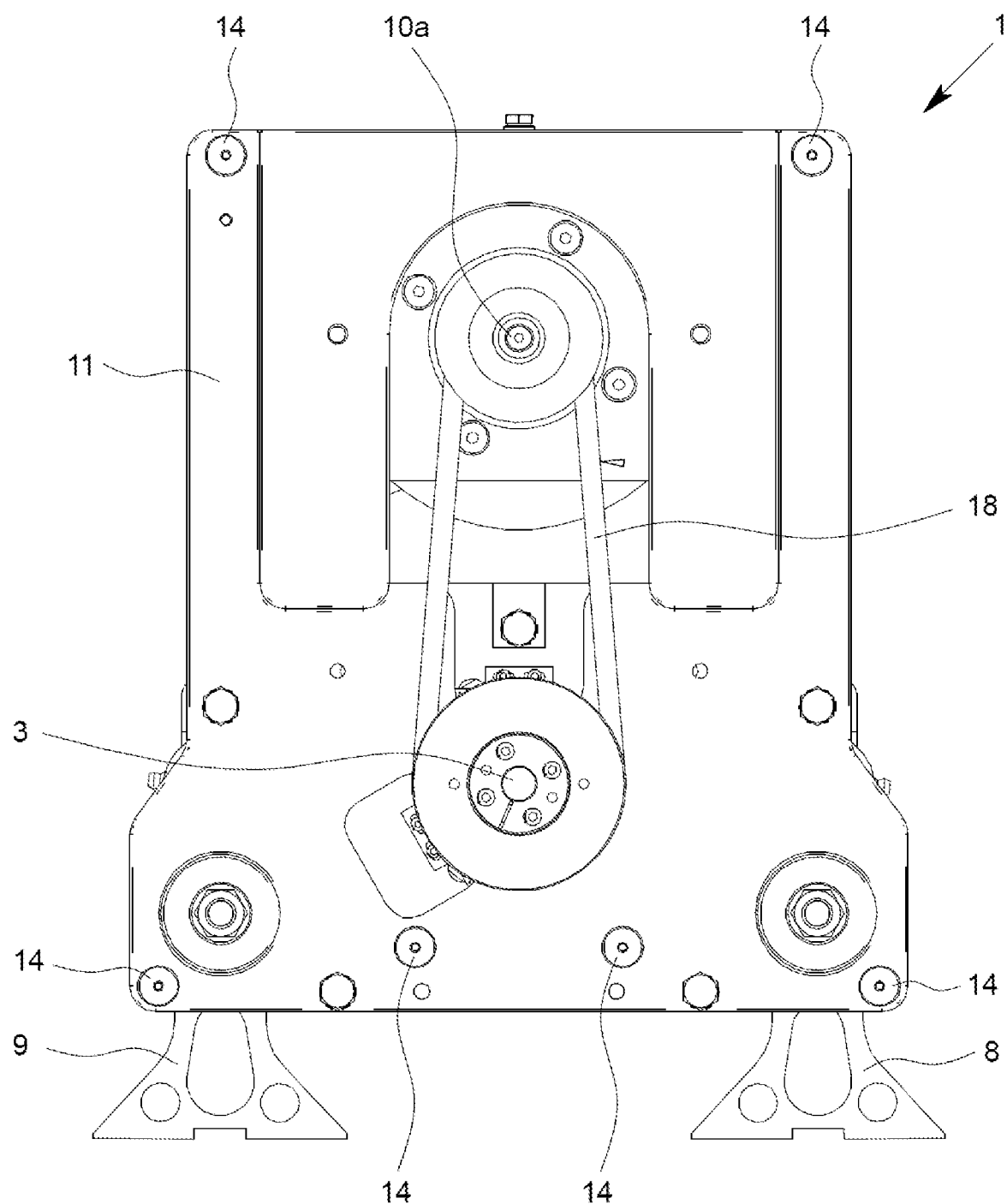
FIG. 4 is a view of the pendulum drive shown in FIG. 2 from beneath.

In order to obtain comparable milling results in respect of the reduction ratio, the mixing and/or homogenization result of the milling operation, in particular in respect of as uniform as possible a breadth of the particle size distribution in milling beakers held on different rockers 8, 9, in particular with short milling times of less than 120 seconds, preferably of less than 60 seconds, further preferably of less than 30 seconds, for example with a milling time of 10 seconds, it is provided in the vibration mill shown in FIGS. 2 to 7 to position the center of gravity SP of the pendulum drive 1, shown schematically in FIG. 2, by arranging the components of the pendulum drive 1 so that the center of gravity SP is equidistant from both oscillation axes 4, 5.

As is apparent in particular from FIG. 2, the rockers 8, 9 are arranged mirror-symmetrically with respect to the eccentric shaft 3 and to the motor unit 10, wherein the center of gravity SP of the pendulum unit 1 lies on the axis of symmetry Y. The eccentric axis 2 and the vertical axis 21 through the center of gravity of the motor unit 10 also lie on the axis of symmetry Y.

An isosceles triangle is thereby formed by the center of gravity SP of the pendulum drive 1 and the oscillation axes 4, 5 in a horizontal center of gravity plane through the center of gravity SP. The eccentric axis 2 intersects the median of the side line, passing through the oscillation axes 4, 5, of the triangle formed in the center of gravity plane by the center of gravity SP of the pendulum drive 1 and the oscillation axes 4, 5 preferably in the middle.

It is additionally apparent from FIG. 2 that—as in the case of the vibration mill of FIG. 1—the oscillation axes 4, 5 are arranged mirror-symmetrically with respect to the eccentric axis 2 and their points of intersection with the center of gravity plane form an isosceles triangle.

Unlike in the vibration mill shown in FIG. 1, it is provided in the vibration mill shown in FIGS. 2 to 7 that the oscillation axes 4, 5 and the vertical axis 21 through the center of gravity of the motor unit 10 likewise form an isosceles triangle in the center of gravity plane. By arranging the motor unit 10 so that the vertical center of gravity axis of the motor unit 10 lies on the axis of symmetry Y, the center of gravity of the pendulum drive 1 is displaced to the axis of symmetry Y, which leads to a strictly symmetrical construction of the pendulum drive 1 and, during operation of the vibration mill, ensures identical (opposing) oscillating movements of the milling beakers, in particular identical frequencies and accelerations.

It is further apparent from FIG. 2 that the center of gravity SP of the pendulum drive 1 lies on the median of the side line, passing through the oscillation axes 4, 5, of the triangle formed in the center of gravity plane by the oscillation axes 4, 5 and the vertical axis 21 through the center of gravity of the motor unit 10.

The center of gravity SP of the pendulum drive 1, resulting from the mass, geometry and arrangement of the components of the pendulum drive 1, can also be displaced laterally relative to the axis of symmetry Y in the direction towards one of the oscillation axes 4, 5, as compared with the position shown in FIG. 2, where the center of gravity SP lies exactly on the axis of symmetry Y. The lateral distance a of the center of gravity SP of the pendulum drive 1 from the axis of symmetry Y can thus be less than 20%, preferably less than 15%, further preferably less than 10%, particularly preferably less than 5%, of half the distance between the oscillation axes 4, 5.

During operation of the vibration mill, oscillations of the motor unit 10 and of the eccentric shaft 3 and, where appropriate, oscillations of the belt drive, are transmitted to the base plate 11. The center of gravity SP of the pendulum drive 1 can be so positioned, by arranging the motor unit 10 relative to the other components of the pendulum drive 1, that oscillations of the base plate 11 at the rear outer edge 26 of the base plate 11 facing the motor unit 10 and at the front outer edge 27 facing the rockers 8, 9 are at least substantially compensated.

In the embodiment shown, the center of gravity SP of the pendulum drive 1 is displaced in the direction towards the eccentric axis 2 relative to the midpoint MP of the median of the triangle formed in the center of gravity plane by the vertical axis 21 and the oscillation axes 4, 5. The distance b of the center of gravity SP of the pendulum drive 1 from the midpoint MP (FIG. 2) of the median can be less than 20%, preferably less than 15%, further preferably less than 10%, of half the length of the median.

In addition, in another embodiment, the center of gravity SP of the pendulum drive 1 can in principle also be displaced relative to the midpoint MP in the direction towards the vertical axis 21 passing through the center of gravity of the motor unit 10, in dependence on the mass and geometry and also the arrangement of the components of the pendulum drive 1.

Figure 5:
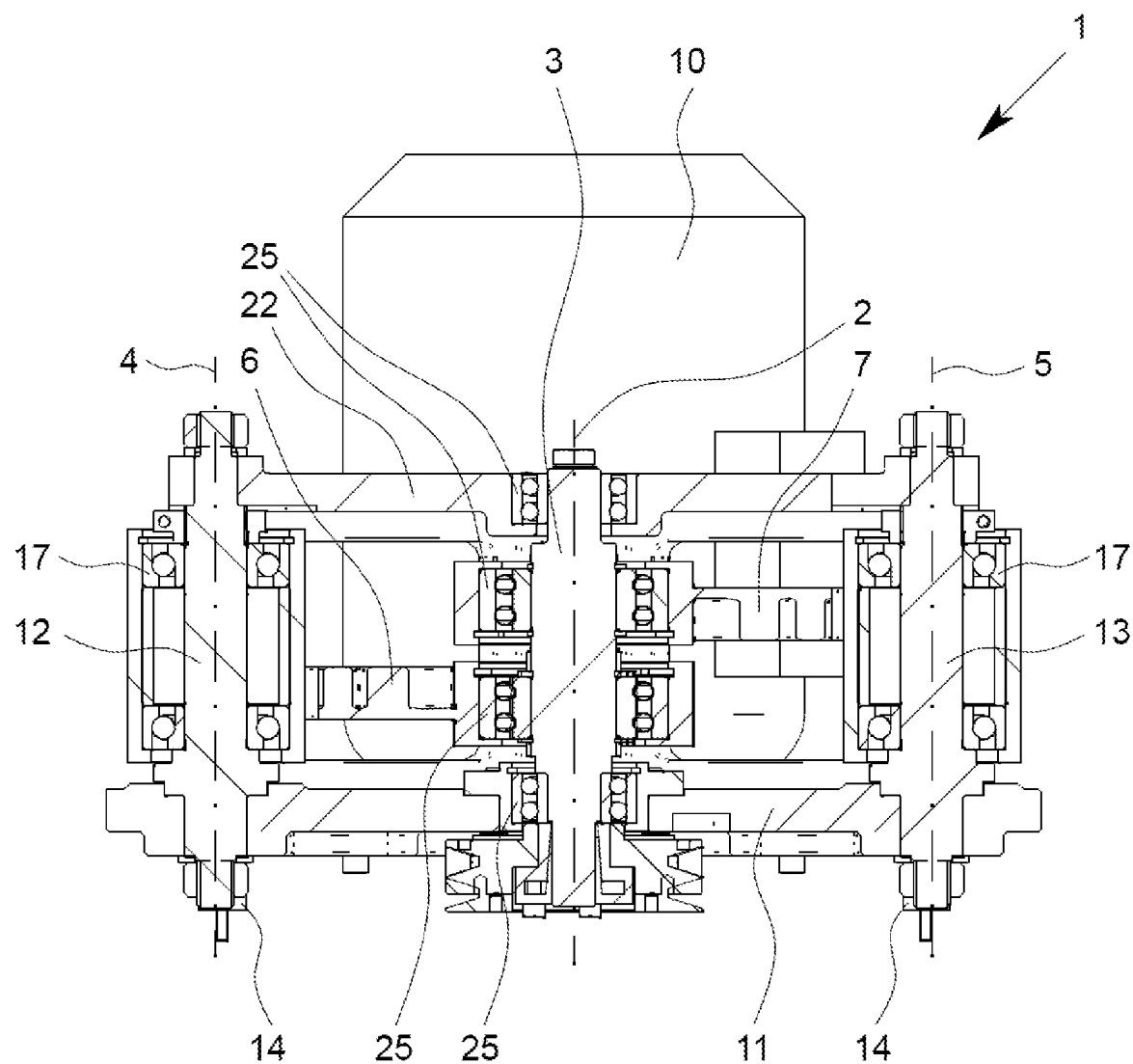
FIG. 5 is a sectional view of the pendulum drive of FIG. 2 along the cutting line V-V.

As is apparent in particular from FIG. 5, the eccentric shaft 3 is mounted or held vertically in the region beneath and above the couplers 6, 7 via the base plate 11 on the one hand and a cross-member 22 on the other hand. In addition, a rear supporting wall 23 and a front supporting wall 24 (FIG. 6) are provided, via which the cross-member 22 is connected to the base plate 11. This results in a frame-, grid- or rack-like bearing structure for the eccentric shaft 3, in order to rule out as far as possible a disadvantageous oscillation behavior of the shaft bearing during operation of the vibration mill. Moreover, the rockers 8, 9 are held and mounted in the bearing structure via the bearing pins 12, 13.

Figure 6:
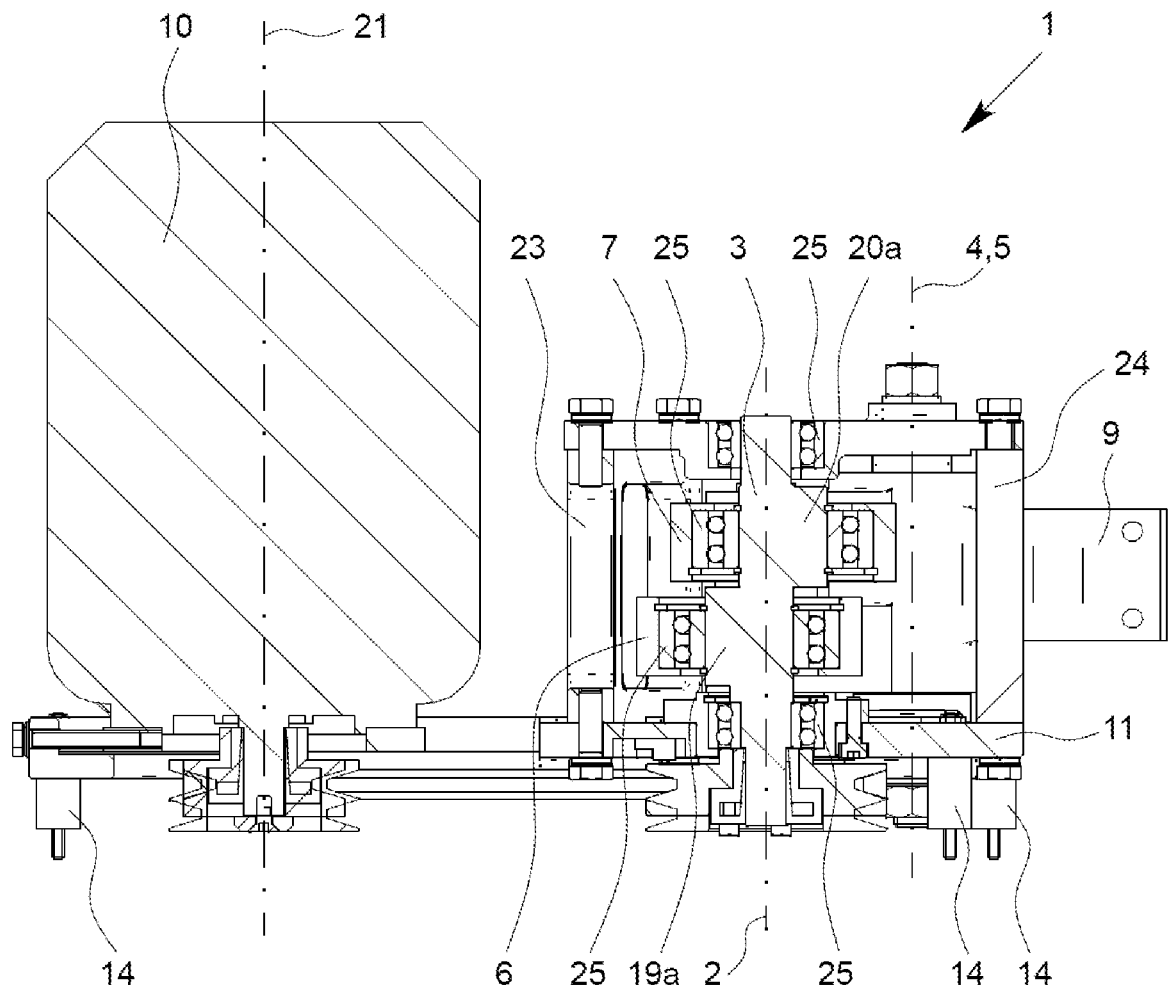
FIG. 6 is a sectional view of the pendulum drive shown in FIG. 2 along the cutting line VI-VI.
Figure 7:
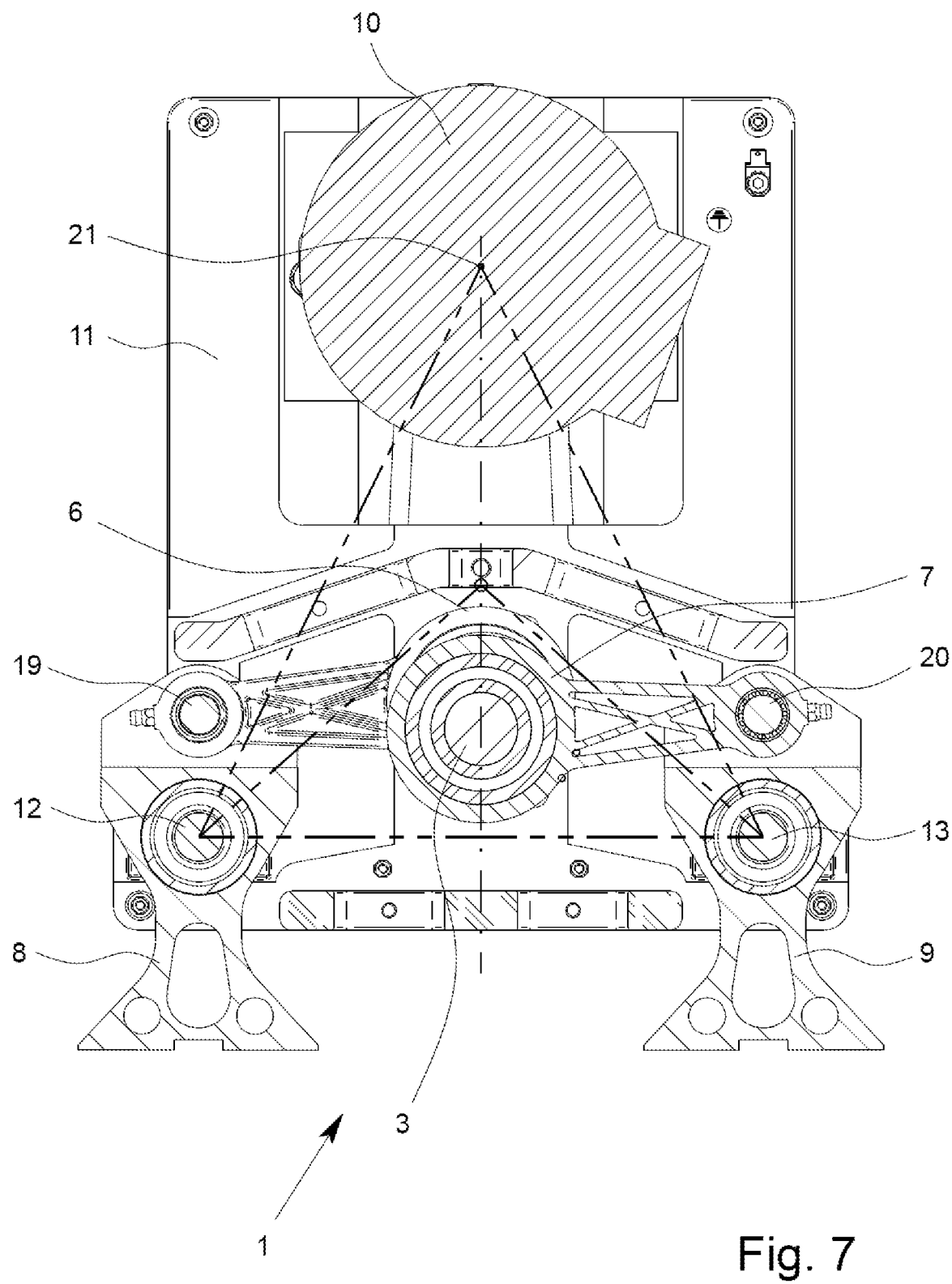
FIG. 7 is a sectional view of the pendulum drive shown in FIG. 2 along the cutting line VII-VII from FIG. 3.

Mounting of the rockers 8, 9 on the bearing pins 12, 13 preferably takes place via inclined ball bearings 17 (FIG. 5). Mounting of the couplers 6, 7 on the pins 19, 20 can take place via needle bearings. Mounting of the couplers 6, 7 on the eccentric shaft 3 and mounting of the eccentric shaft 3 on the base plate 11 and the cross-member 22 preferably takes place via grooved ball bearings 25, which is shown in FIG. 6.

LIST OF REFERENCE NUMERALS 1 pendulum drive
2 eccentric axis
3 eccentric shaft
4 oscillation axis
5 oscillation axis
6 coupler
7 coupler
8 rocker
8a milling beaker holder
9 rocker
9a milling beaker holder
10 motor unit
10a motor shaft
11 base plate
12 bearing pin
13 bearing pin
14 damping element
15 bottom part
16 belt
17 inclined ball bearing
18 V-belt
19 pin
19a eccentric
20 pin
20a eccentric
21 axis
22 cross-member
23 supporting wall
24 supporting wall
25 grooved ball bearing
26 outer edge
27 outer edge
Y axis of symmetry

The invention claimed is:

1. A vibration mill for at least two milling beakers which perform oscillations in a horizontal position, the vibration mill having:
   a multi-part pendulum drive, wherein the pendulum drive comprises:
      at least one eccentric shaft rotatably mounted about a vertical eccentric axis;
      at least two rockers for holding the milling beakers, which rockers are each mounted about a respective vertical oscillation axis so as to be capable of oscillation and are connected via couplers to the eccentric shaft; and
      a motor unit coupled with the eccentric shaft as a drive for the eccentric shaft;
   wherein a rotary movement of the eccentric shaft can be converted via the couplers into an oscillating movement of the rockers;
   wherein a center of gravity of the pendulum drive in a horizontal center of gravity plane is at least substantially equidistant from both oscillation axes; and wherein the center of gravity of the pendulum drive is located between a vertical center of gravity axis of the motor unit and the vertical eccentric axis.

2. The vibration mill as claimed in claim 1, wherein the motor unit, the eccentric shaft and the rockers are arranged and/or mounted on a common base plate and together with the base plate form a system capable of oscillation.

3. The vibration mill as claimed in claim 1, wherein the rockers are arranged mirror-symmetrically with respect to the motor unit and/or to the eccentric shaft and wherein the center of gravity of the pendulum drive lies on the axis of symmetry.

4. The vibration mill as claimed in claim 1, wherein the center of gravity of the pendulum drive and the oscillation axes form an isosceles triangle in the center of gravity plane.

5. The vibration mill as claimed in claim 4, wherein the eccentric axis intersects a median of a side line, passing through the oscillation axes, of the triangle formed in the center of gravity plane by the center of gravity of the pendulum drive and the oscillation axes.

6. The vibration mill as claimed in claim 1, wherein the oscillation axes and the vertical center of gravity axis of the motor unit form an isosceles triangle in the center of gravity plane.

7. The vibration mill as claimed in claim 6, wherein the center of gravity of the pendulum drive lies on a median of a side line, passing through the oscillation axes, of the triangle formed in the center of gravity plane by the oscillation axes and the vertical center of gravity axis of the motor unit.

8. The vibration mill as claimed in claim 1, wherein a frame-, grid- or rack-like bearing structure for a shaft bearing of the eccentric shaft and for bearing the rockers is provided.

9. The vibration mill as claimed in claim 1, wherein an adjusting device for automatic adjustment of the position of the motor unit and/or of the position of at least one balancing weight is provided.

10. A method for milling a milling material by means of a vibration mill in at least two milling beakers which perform oscillations in a horizontal position, wherein the vibration mill comprises a multi-part pendulum drive having an eccentric shaft rotatably mounted about a vertical eccentric axis, two rockers for holding the milling beakers, which rockers are each mounted about a respective vertical oscillation axis so as to be capable of oscillation and are connected via couplers to the eccentric shaft, and a motor unit coupled with the eccentric shaft as a drive for the eccentric shaft;

wherein a rotary movement of the eccentric shaft is converted via the couplers into oscillating movements of the rockers;

wherein the motor unit and/or at least one balancing weight of the pendulum drive is so displaced and/or adjusted that a center of gravity of the pendulum drive in a horizontal center of gravity plane is at least substantially equidistant from both oscillation axes; and wherein the center of gravity of the pendulum drive is located between a vertical center of gravity axis of the motor unit and the vertical eccentric axis.

* * * * *